United States Patent
Weiher (10) Patent No.: US 8,631,721 B2
(45) Date of Patent: *Jan. 21, 2014

(54) ACTUATOR MOUNTING

(71) Applicant: Gustav Magenwirth GmbH & Co. KG, Bad Urach (DE)

(72) Inventor: Franz Weiher, Neustetten (DE)

(73) Assignee: Gustav Magenwirth GmbH & Co. KG, Bad Urach (DE)

(*) Notice: Subject to any disclaimer, the term of this patent is extended or adjusted under 35 U.S.C. 154(b) by 0 days.

This patent is subject to a terminal disclaimer.

(21) Appl. No.: 13/854,174

(22) Filed: Apr. 1, 2013

(65) Prior Publication Data

US 2013/0220064 A1 Aug. 29, 2013

Related U.S. Application Data

(62) Division of application No. 12/197,343, filed on Aug. 25, 2008, now Pat. No. 8,408,090.

(30) Foreign Application Priority Data

Aug. 24, 2007 (DE) .......................... 10 2007 040 364

(51) Int. Cl.
*B62K 23/06* (2006.01)

(52) U.S. Cl.
USPC ......... 74/525; 188/24.11; 188/344; 74/501.6; 74/502.2; 60/594

(58) Field of Classification Search
USPC .............. 74/473.14, 473.15, 501.6, 489, 523, 74/525, 502.2; 188/344, 24.11; 60/594; 411/393, 999; 251/112
See application file for complete search history.

(56) References Cited

U.S. PATENT DOCUMENTS

| | | | |
|---|---|---|---|
| 3,686,497 A | 8/1972 | Di Salvo et al. | 362/428 |
| 4,063,474 A | 12/1977 | Kiopping | 81/474 |
| 4,138,768 A | 2/1979 | Roth | 425/307 |
| 4,425,819 A | 1/1984 | Shimano | 74/489 |
| 4,635,442 A | 1/1987 | Bass | 60/594 |
| 4,730,509 A | 3/1988 | Hornady | |
| 4,779,482 A | 10/1988 | Kawaguchi | 74/523 |
| 4,840,082 A | 6/1989 | Terashima et al. | 74/523 |
| 5,491,915 A | 2/1996 | Robinson | 37/458 |

(Continued)

FOREIGN PATENT DOCUMENTS

| | | |
|---|---|---|
| DE | 20018705 | 2/2001 |
| DE | 60024598 | 8/2006 |

(Continued)

*Primary Examiner* — Thomas Diaz
(74) *Attorney, Agent, or Firm* — Alan Kamrath; Kamrath IP Lawfirm, P.A.

(57) ABSTRACT

An actuator mounting, in particular, a clutch or brake mounting for a vehicle, includes a mounting housing (3) with an attachment shell (2) for attaching the mounting to a handlebar or a similar steering element, a hand lever (8) supported to rotate on the mounting housing (3), and a mechanical or hydraulic force transmission device arranged on the mounting housing (3). The actuator mounting includes a carrier plate (9) supported on the rotational bearing (7) in common with the hand lever (8) as an intermediate transmission element with multiple functions. The carrier plate (9) has contact points (16, 32, 34) for applying force to or tensioning the hand lever (8), the force transmission device, and the mounting housing stop (35).

17 Claims, 6 Drawing Sheets

(56) References Cited

U.S. PATENT DOCUMENTS

| | | |
|---|---|---|
| 5,636,518 A | 6/1997 | Burgoyne et al. ............... 60/594 |
| 6,393,936 B1 | 5/2002 | Barnett |
| 6,457,378 B2 | 10/2002 | Hatakoshi et al. ............. 74/525 |
| 6,516,682 B2 | 2/2003 | Brainard ..................... 74/502.2 |
| 6,739,133 B2 | 5/2004 | Barnett |
| 6,892,603 B2 | 5/2005 | Barnett |
| 7,204,088 B2 | 4/2007 | Uchiyama et al. ............ 60/594 |
| 7,503,237 B2 | 3/2009 | Cornolti et al. ................ 74/525 |
| 8,408,090 B2 * | 4/2013 | Weiher ........................... 74/525 |
| 2005/0160870 A1 | 7/2005 | Barnett .......................... 74/523 |
| 2006/0070483 A1 | 4/2006 | Dimsey .......................... 74/525 |
| 2007/0158155 A1 | 7/2007 | Carrara et al. ................ 188/344 |
| 2007/0283774 A1 | 12/2007 | Lavezzi et al. |

FOREIGN PATENT DOCUMENTS

| | | |
|---|---|---|
| DE | 102005014065 | 9/2006 |
| EP | 1 325 863 | 7/2003 |
| EP | 1 439 116 | 7/2004 |
| JP | 2001260972 | 9/2001 |
| JP | 2004155355 | 6/2004 |
| WO | WO2005049416 | 6/2005 |

\* cited by examiner

ACTUATOR MOUNTING

CROSS REFERENCE

The present application is a division of U.S. application Ser. No. 12/197,343, filed Aug. 25, 2008, now U.S. Pat. No. 8,408,090.

BACKGROUND

The invention relates to an actuator mounting and, in particular, to a clutch or brake mounting for a vehicle, with a mounting housing with an attachment for mounting to a handlebar or a similar steering element, a hand lever supported to rotate on the mounting housing, and a mechanical or hydraulic force-transmission device arranged on the mounting housing.

Actuator mountings of the type noted above are used, for example, in motorcycles and have essentially proven themselves in practice.

For example, actuator mountings with a hydraulic force-transmission device are known. It is problematic that the force transmission between the hand lever and a hydraulic piston is not well protected against contamination and the penetration of water.

Another construction provides an intermediate plate between the hand lever and a plunger rod. For the hand lever and the intermediate plate, different rotational points are provided, so that the mechanism is complicated and expensive to produce.

SUMMARY

Therefore, the object of the invention is to create an actuator mounting, in which the force-transmission parts are protected from contamination and which can also be produced easily and economically.

This objective is met according to the invention in that a carrier plate is supported as an intermediate transmission element with multiple functions on the rotational bearing in common with the hand lever and in that the carrier plate has engagement positions for applying force to or tensioning the hand lever, the force transmission device, and a mounting housing stop.

The carrier plate forms an intermediate transmission element for the tension or force transmission from the hand lever to the force transmission device. Through the arrangement on a common rotational bearing with the hand lever, the construction of the actuator mounting can be realized easily and economically.

In one preferred construction of the invention, the hand lever can be rotated against the activation direction, and the carrier plate can be pressurized by a restoring element advantageously set in a receptacle. In this way, breaking the hand lever is prevented, for example, in a fall.

In previous actuator mountings, after rotating the hand lever, the force transmission device with the plunger rod is released. In addition, care must be taken that the plunger rod is secured on the hydraulic piston against falling out. This securing of the plunger rod is realized in the activating mounting according to the invention by the carrier plate also contacting a turned hand lever.

Preferably, a seal, advantageously a bellows seal, is provided for sealing the force transmission device and also a turned hand lever, by which the force transmission elements are protected from contamination and penetrating water.

A useful refinement provides that the carrier plate has, on its side facing the outside of the hand lever, a rounded section running concentric to the rotational axis, so that the hand lever can rotate against the activation direction and against the restoring force of the restoring element.

Preferably, the carrier plate has a recess, in particular, a groove that is concentric about the rotation point, as a restoring element receptacle. The restoring element is preferably a spring, in particular, a leg spring, which is inserted into the concentric groove.

A construction variant of the invention provides that the hand lever has at least one stop formation that can be separated by a desired fracture point and that advantageously in the region of the housing stop for the carrier plate, a counter stop is provided for the stop formation on the mounting housing. In this way, it is achieved that the hand lever cannot rotate inadvertently or, for example, due to shaking or a similar impulse. Nevertheless, the safety device can still rotate the lever for an overload, for example, for a drop. Even then, the hand lever remains usable, because it is rotated back into the operating position by the restoring element contacting it.

In one construction of the invention, the hand lever has a fork-shaped bearing receptacle, in which the carrier plate is inserted on the rotational bearing. The mounting housing has, for example, a U-shaped receptacle, in which the bearing receptacle of the hand lever and the carrier plate can be inserted. The hand lever encompasses the carrier plate.

Preferably, the actuator mounting has a hydraulic force transmission device with a hydraulic cylinder and a hydraulic piston. The invention can also be used, however, in combination with mechanical actuator mountings, for example, Bowden cable actuator mountings.

In a preferred construction, a dome-shaped receptacle, in which a plunger rod is engaged for pressurizing the hydraulic piston, is provided on the carrier plate or a similar carrier part as a contact point for the hydraulic piston. Due to the dome-shaped construction, transmission of force via another angular range is possible, and assembly or maintenance is simple, because the connection is self-centering and requires absolutely no attachment.

One advantageous construction of the invention provides a bellows seal for sealing the force transmission parts between the hand lever and the hydraulic piston, in particular, between a dome-shaped receptacle of the plunger rod and the hydraulic cylinder, against outer influences. Peripheral grooves for inserting the bellows seal are arranged on the dome-shaped receptacle and on the mounting housing. Therefore, the force-transmission parts are very well protected from dirt, contaminants and water, and for example, also high-pressure cleaners. Because when the hand lever is rotated, the carrier plate also contacts the plunger rod. As the bellows seal is thus not negatively affected, the hydraulic system has the best possible protection.

In another advantageous construction of the invention, a handle width adjustment device is provided on the hand lever, and has on the hand lever a threaded borehole for receiving a handle width adjustment screw for pressurizing the contact position on the carrier plate. Through the arrangement of the handle width adjustment screw on the inside between the handle lever and the carrier plate, a compact construction is possible. In addition, the risk of inadvertent adjustment is low.

Preferably, the handle width adjustment screw has an outer activation head with radial projections for hand activation, so that the adjustment screw can also be easily operated with gloves.

In one variant of the invention, the activation head has, on its activation end side, at least two crossed profile notches.

The carrier plate has, at the associated contact position, a counter formation approximately adapted to the profile of the activation head notches. Therefore, the handle width adjustment can be locked in steps.

It is especially preferred the handle width adjustment screw has a peripheral groove corresponding in its width to the adjustment path on its section engaging in the threaded borehole, and a securing pin, which engages in the groove, is arranged on the hand lever tangential to the threaded borehole. The width of the groove defines the maximum possible adjustment path, and the securing pin prevents the adjustment screw from being screwed completely out of the threaded borehole. Thus, the adjustment screw cannot be lost.

A very special advantage of the invention is that the carrier plate has a one-piece construction, in particular, as a molded or diecast part made from lightweight metal or plastic. Therefore, the carrier plate is simple and economical to produce, without requiring a complicated cutting finishing process.

Thus, the carrier plate combines all of the essential transmission functions into one component, which is simple and economical to produce. Through the common support with the hand lever, the carrier plate also can be exchanged easily.

BRIEF DESCRIPTION OF THE SEVERAL VIEWS OF THE DRAWINGS

One embodiment of the invention is explained in more detail below with reference to the drawings.

Shown are.

DETAILED DESCRIPTION OF THE PREFERRED EMBODIMENTS

Figure 1:
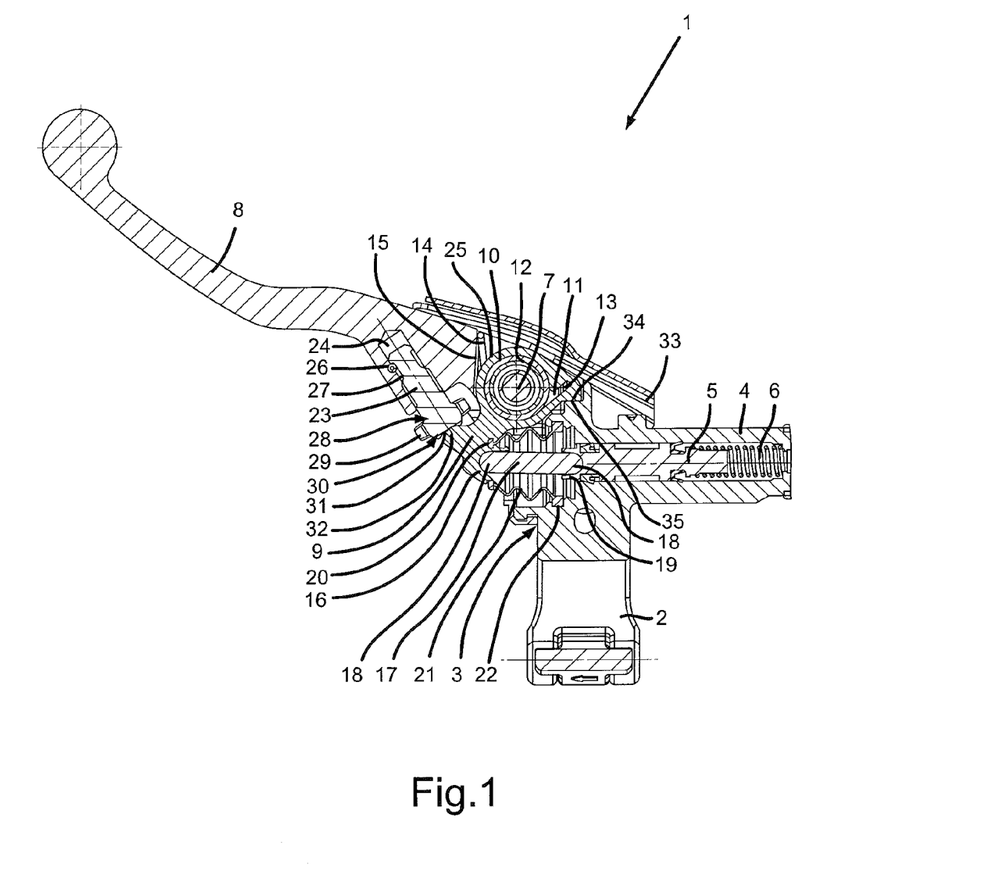
FIG. 1 is a sectional view of a brake mounting.
Figure 4:
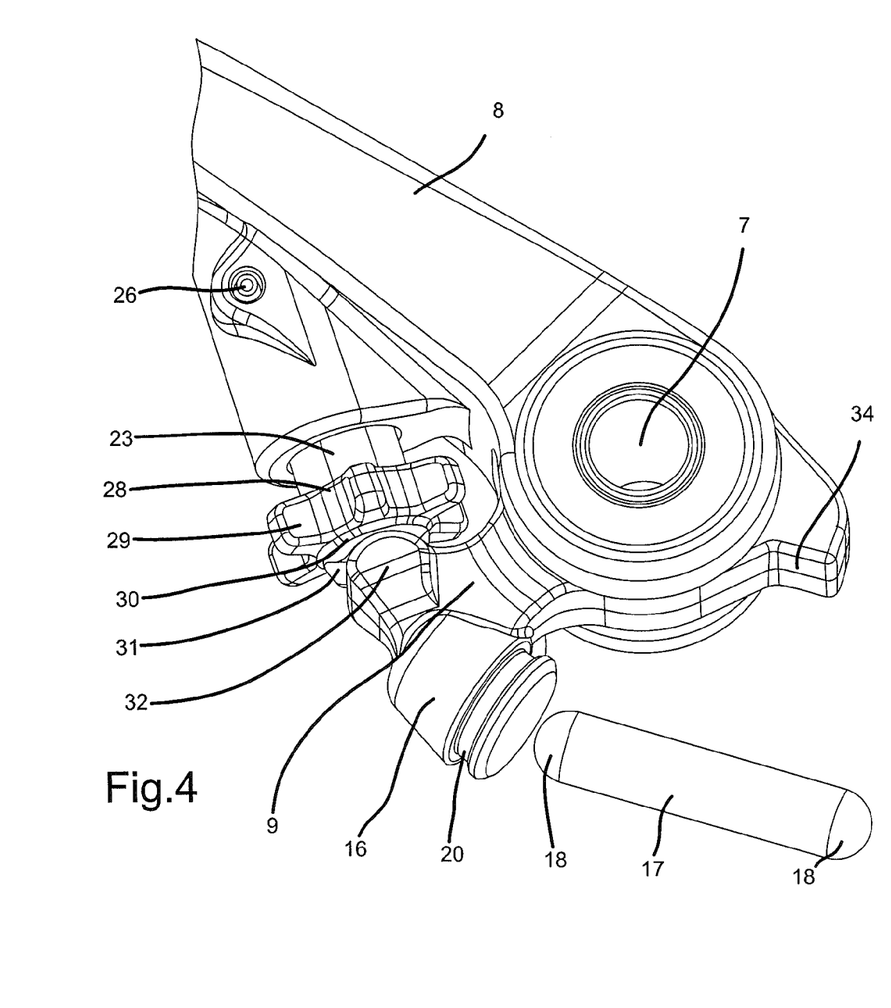
FIG. 4 is a perspective partial view of the hand lever in the region of the carrier plate.

FIG. 1 shows a hydraulic brake mounting designated overall with 1 for a motorcycle. However, the invention can be used just as easily for a clutch mounting. The brake mounting 1 has an attachment shell 2 for assembly on a handlebar (not shown). In parallel to the handlebar, on the brake mounting housing 3 there is a hydraulic cylinder 4, in which a hydraulic piston 5 and a compression spring 6 are arranged. Furthermore, on the brake mounting housing 3 there is a rotational bearing 7, on which a hand lever 8 is supported with its fork-shaped bearing receptacle and on which a carrier plate 9 located in-between is supported (FIG. 4). The hand lever 8 with the carrier plate 9 is supported in a fork-shaped or U-shaped housing arrangement.

Figure 3:
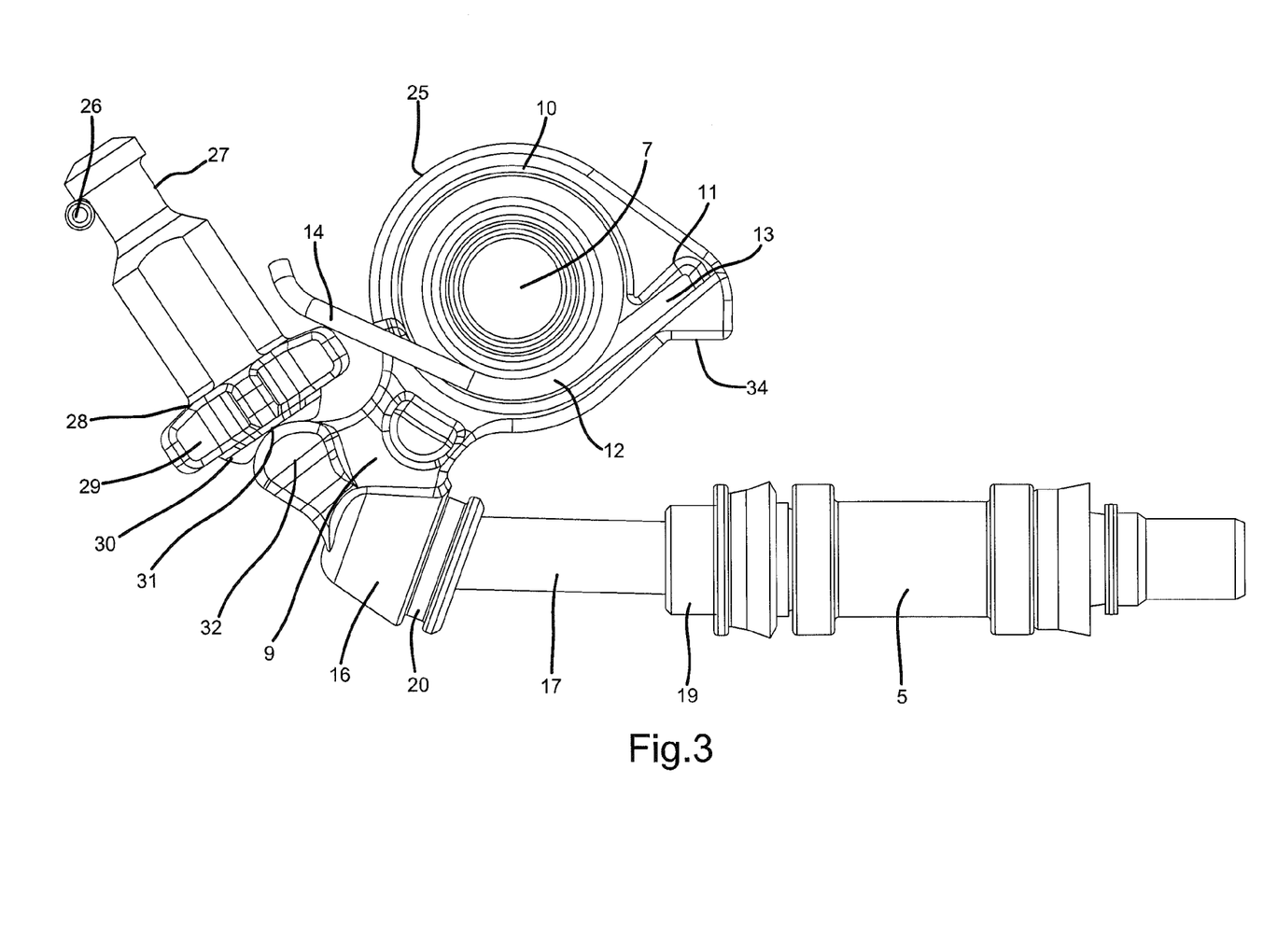
FIG. 3 is a detail view of the carrier plate with a handle width adjustment screw and a hydraulic piston.

Details of the hand lever 8 and the carrier plate 9 can be easily seen in FIGS. 3 and 4, and the following description always refers to these figures, if not explicitly stated.

The carrier plate 9 has a groove 10 that is concentric to the rotational bearing 7 with a tangential projection 11 and in which a leg spring 12 is inserted. Thus, a leg 13 of the spring 12 lies in the tangential projection 11 and is supported on the carrier plate 9 (FIG. 3), while the other leg 14 is supported on a spring contact surface 15 on the hand lever 8 (FIG. 1). In the region of the spring contact surface 15, the carrier plate 9 has a rounded section 25, which is concentric to the rotational bearing 7 and which allows turning of the hand lever 8 against the brake activation direction.

On the carrier plate 9 there is a stop surface 34, which, in the rest position of the hand lever 8, is force loaded by the compression spring 6 to contact a mounting housing stop 35 (FIG. 1).

The carrier plate 9 furthermore has a dome-shaped receptacle 16, in which a plunger rod 17 engages with a rounded end 18. The other side of the plunger rod engages in the similarly dome-shaped end 19 of the hydraulic piston 5, so that the movement of the carrier plate 9 is transferred to the hydraulic piston 5 via the plunger rod 17.

Figure 2:
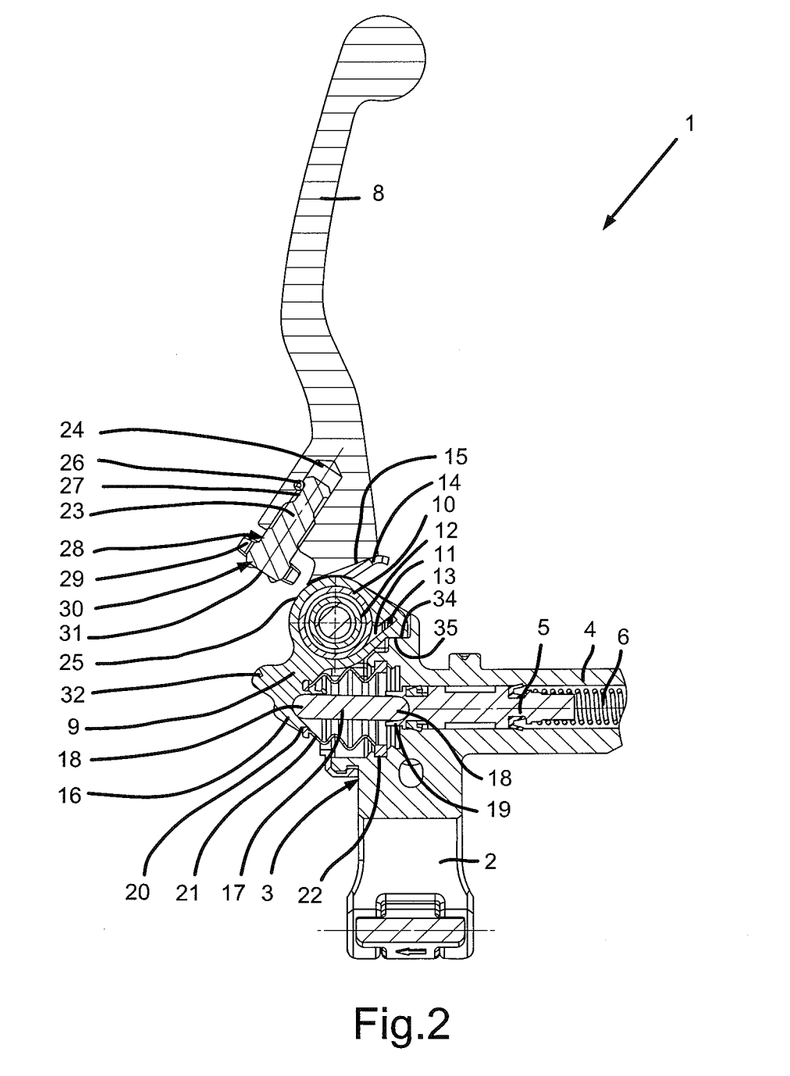
FIG. 2 is a sectional view of the brake mounting in FIG. 1 with a rotated hand lever.

On the dome-shaped receptacle 16 on the carrier plate 9 there is a peripheral groove 20, in which a bellows seal 21 is inserted. On the mounting housing 3 there is, in the region of the hydraulic cylinder 4, also a peripheral groove 22, in which the other end of the bellows seal 21 engages and thus completely seals the force transmission parts (FIGS. 1 and 2).

On the inside of the hand lever 8, for receiving a handle width adjustment screw 23, there is a threaded borehole 24. In a threaded borehole cutting tangentially the threaded borehole 24, a securing screw 26 is inserted, which engages a groove 27 in the handle width adjustment screw 23, in order to prevent the adjustment screw 23 from being removed completely. The width of the groove 27 defines the adjustment range of the handle width adjustment screw 23.

On the activation head 28 of the adjustment screw 23 there are radial projections 29 for better operation. On the end 30 of the activation head 28 there are two intersecting notches 31 with a half-round profile, so that a correspondingly shaped formation 32 on the carrier plate 9 engages in one of the notches 31. Through the intersecting arrangement, the handle width can be set and locked in a stepped way in quarter turns.

In the region of the carrier plate 9 there is a cover 33, which extends from the hand lever 8 up to the mounting housing 3 and which protects the carrier plate 9 from contamination and moisture (FIG. 1).

FIG. 2 shows the brake mounting 1 with a hand lever turned against the activation direction, as can occur in a fall. For the sake of simplicity, the cover 33 is left off. It can be easily seen that only the hand lever 8 with the handle width adjustment screw 23 is turned over, while the carrier plate 9 contacting the housing stop 35 remains with the plunger rod 17 and the bellows seal 21 in the operation position on the hydraulic cylinder 4. Therefore, the force or pressure transmission parts remain protected at all times, and the function is not negatively affected. Due to the restoring spring 12, the hand lever 8 is returned to the operation position.

Figure 5:
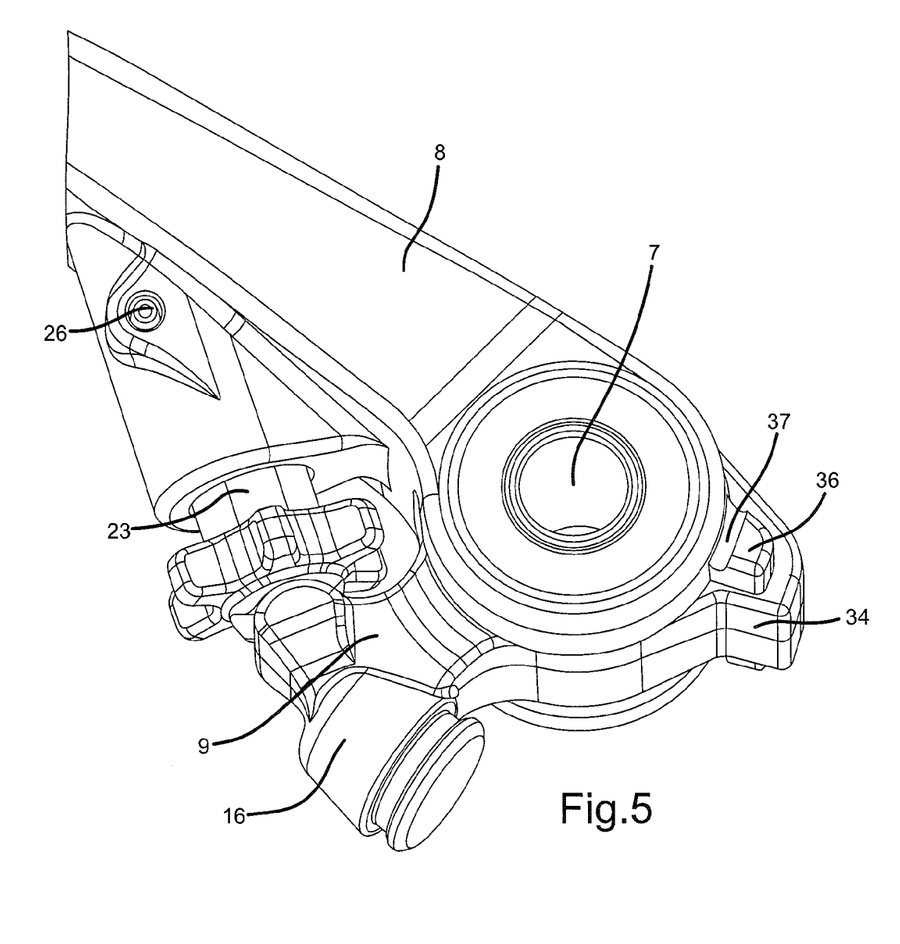
FIG. 5 is a perspective partial view of the hand lever in the region of the carrier plate with a desired fracture point on the hand lever.
Figure 6:
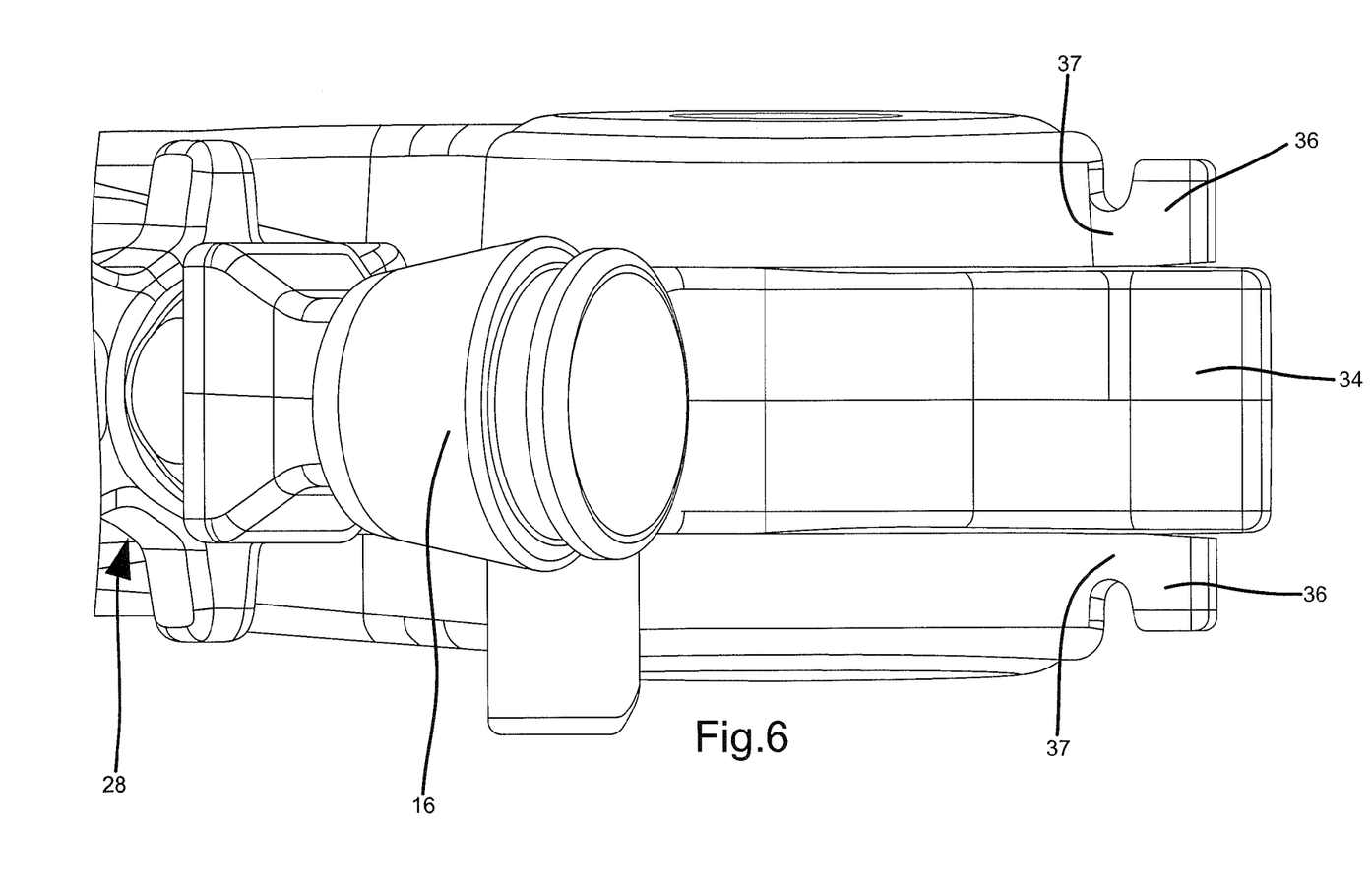
FIG. 6 is a view of the hand lever shown in FIG. 5 with predetermined fracture points from a different perspective.

The hand lever 8 in FIGS. 5 and 6 corresponds in configuration and function to the hand lever in FIGS. 1 to 4, but has, in the region of the housing stop (FIGS. 1 and 2) on each of its fork-shaped receptacles, a formation 36, which is connected to the other hand lever via desired fracture points 37. The hand lever 8 therefore cannot be turned in an undesired way, which could otherwise occur, among other things, due to impacts or bumps. However, for an overload, for example, due to a fall, the formations 36 can break at the desired fracture points 37, so that the hand lever 8 can turn and therefore is not damaged and remains functional. Therefore, the function of a non-rotating hand lever is combined with the safety of a rotating lever.

The invention claimed is:

1. Actuator mounting for a clutch or brake for a vehicle comprising:
    a mounting housing with an attachment for attaching the mounting to a handlebar or steering element, with the mounting housing including a mounting housing stop;
    a hand lever rotatably supported on a rotational bearing on the mounting housing;
    a mechanical or hydraulic force transmission device arranged on the mounting housing;
    a carrier plate rotatably supported on the rotational bearing, wherein the carrier plate has a first contact point for applying force or tension on the force transmission device, a second contact point for applying force or tension on the hand lever, and a third contact point for applying force or tension on the mounting housing stop;
    a stop formation for applying force on the housing stop, with the housing stop acting as a counter stop for the stop formation on the mounting housing; and
    fracture points between the stop formation and the hand lever, with breakage occurring at the fracture points in an overload due to the rotation of the hand lever relative to the mounting housing.

2. Actuator mounting according to claim 1, wherein a seal is provided for sealing the force transmission device.

3. Actuator mounting according to claim 2, wherein the seal is a bellows seal.

4. Actuator mounting according to claim 1, wherein the hand lever rotates against an activation direction and the carrier plate is force loaded by a restoring element inserted into a receptacle.

5. Actuator mounting according to claim 4, wherein the carrier plate has a recess comprising a groove concentric about the rotational bearing, as the restoring element receptacle.

6. Actuator mounting according to claim 4, wherein the restoring element is a spring.

7. Actuator mounting according to claim 6, wherein the spring comprises a leg spring.

8. Actuator mounting according to claim 4, wherein the carrier plate has, on a side facing an outer side of the hand lever, a rounded section extending concentric to a rotational axis of the hand lever, with the hand lever rotating against the activation direction and against a restoring force of the restoring element.

9. Actuator mounting according to claim 1, wherein the hand lever has a fork-shaped bearing receptacle, in which the carrier plate is inserted on the rotational bearing.

10. Actuator mounting according to claim 1, wherein the hydraulic force transmission has a hydraulic cylinder and a hydraulic piston.

11. Actuator mounting according to claim 10, wherein a dome-shaped receptacle is located on the carrier plate, and wherein a plunger rod engages in the dome-shaped receptacle for pressurizing the hydraulic piston.

12. Actuator mounting according to claim 11, wherein a bellows seal for sealing the force transmission parts is provided between the hand lever and the hydraulic piston to protect the dome-shaped receptacle, the plunger rod, and the hydraulic cylinder against outside influences, and a peripheral groove for inserting the bellows seal is arranged on the dome-shaped receptacle and on the mounting housing.

13. Actuator mounting according to claim 1, further comprising a handle width adjustment device on the hand lever, and the hand lever includes a threaded borehole for holding a handle width adjustment screw for applying force to a contact point on the carrier plate.

14. Actuator mounting according to claim 1, further comprising:
    a handle width adjustment screw; and
    a threaded borehole in the hand lever threadably receiving the handle width adjustment screw, with the handle width adjustment screw applying force to the second contact point, wherein the handle width adjustment screw has an outer activation head with radial projections for manual activation, with the radial projections located intermediate the threaded bore hole and the carrier plate.

15. Actuator mounting according to claim 14, wherein the activation head has, on a force transmitting end, at least two crossed profile notches and the carrier plate has, on the second contact point, a counter formation adapted to a profile of the activation head notches.

16. Actuator mounting according to claim 14, wherein the handle width adjustment screw has, on a section engaging the threaded borehole, a peripheral, circumferential groove corresponding in width to an adjustment path, and wherein a securing pin is fixed on the hand lever tangential to the threaded borehole and engages in the peripheral, circumferential groove.

17. Actuator mounting according to claim 1, wherein the carrier plate has a one-piece construction and comprises a cast part made from lightweight metal or plastic.

* * * * *